United States Patent [19]

Nishiura et al.

[11] Patent Number: 4,738,513
[45] Date of Patent: Apr. 19, 1988

[54] LIQUID CRYSTAL DISPLAY INCLUDING A NON-LINEAR RESISTANCE ELEMENT

[75] Inventors: Masaharu Nishiura; Tomoyuki Kawashima, both of Kanagawa, Japan

[73] Assignee: Fuji Electric Co., Ltd., Kawasaki, Japan

[21] Appl. No.: 842,550

[22] Filed: Mar. 21, 1986

[30] Foreign Application Priority Data

Mar. 22, 1985 [JP] Japan .................. 60-59209

[51] Int. Cl.⁴ .................. G02F 1/13; G03G 3/36; H01L 27/14
[52] U.S. Cl. .................. 350/332; 350/333; 350/334; 350/331 R; 340/784; 357/30
[58] Field of Search .......... 350/332, 333, 334, 331 R; 357/30 L; 340/784

[56] References Cited

U.S. PATENT DOCUMENTS 4,589,733  5/1986  Yaniv et al. .................. 350/332

FOREIGN PATENT DOCUMENTS 0200227  10/1985  Japan .................. 350/331 R
2147135   5/1985  United Kingdom ......... 340/378

Primary Examiner—Stanley D. Miller
Assistant Examiner—Trong Quang Phan
Attorney, Agent, or Firm—Brumbaugh, Graves, Donohue & Raymond

[57] ABSTRACT

A liquid crystal display of the active matrix type includes a plurality of row electrodes orthogonal with a row of column electrodes and between each crosspoint is included a series arrangement of a liquid crystal element and a non-linear resistance provided by a parallel pair of oppositely poled diodes. Each of the diodes is constructed to have its photosensitive layer shielded from ambient light by its two electrodes, one of which is larger in cross-section than the light-sensitive layer and the other of which wraps around the edges of the layer.

3 Claims, 2 Drawing Sheets

LIQUID CRYSTAL DISPLAY INCLUDING A NON-LINEAR RESISTANCE ELEMENT

FIELD OF THE INVENTION

The present invention relates to a liquid crystal display which consists of a matrix element having a plurality of column electrodes and a plurality of row electrodes, and which has an individual liquid crystal display element and an individual non-linear resistance element connected in series between each crosspoint of the column electrodes and each row electrodes.

BACKGROUND OF THE INVENTION

In recent years, development of high-density display panels has been based importantly on picture display apparatus using liquid crystals. To perform high-density display by use of such display elements which have relatively poor time division properties, the following two approaches have generally been adopted. The first approach involves increasing the display density by means of multiple wiring and the like, setting the time-division degree at an appropriate value, and utilizes a multiple matrix system. The second approach involves forming active elements such as transistors, non-linear resistances, and the like as switches on the panel to accumulate voltage for each picture element, and utilizes an active matrix system. With the first aproach, panel manufacturing is relatively easy but the increase in multiplexity of wiring is limiting, so that the display density cannot be readily increased. With the second approach, the display density can be incresaed considerably but it is difficult to manufacture and to set high-performance switches able to accumulate charge sufficiently in the panel, while retaining high density with few defects. An example of a panel of this active matrix type is disclosed in Japanese Laid-Open Patent Publication No. 15449/1984.

FIG. 1 shows a schematic circuit of a portion of the display disclosed in the above-mentioned Laid-Open Patent Publication.

Such a display includes a matrix on one surface of which is a plurality of row electrodes 21, also sometimes termed the scanning electrodes, of which three are shown, designated S1, S2 and S3 and on the opposite surface of which is a plurality of column electrodes 23, also sometimes known as the data electrodes, of which three are shown, designated D1, D2 and D3. At the crosspoints corresponding to the points at which these electrodes would intersect if in a common plane rather than on spaced planes, are formed the display elements, each corresponding to a picture element. At each crosspoint serially connected between the opposed electrodes is included a separate liquid crystal element 24 and a separate parallel pair of oppositely-poled diodes 22, which serve as a non-linear resistance.

As depicted, the row and column electrodes are orthogonal to form a two-dimensional array of picture elements. Typically the set of electrodes on the viewing side of the display are transparent for light transmission. Liquid crystal elements typically of thickness of about ten microns are included between the sets of electrodes.

The typical structure of one diode of the diode pair 22 included in FIG. 1 is shown in section in FIG. 2. Actually, to increase the threshold voltage of each of these diodes, each effectively is a series connection of two PIN sets of layers.

To this end, the diode is formed on a transparent insulating substrate 1, typically of glass. The substrate directly supports transparent electrode 2, an extension of which becomes electrodes 21 shown in FIG. 1, and transparent electrode 3, an extension of which makes connection to one side of the liquid crystal element 24, as shown in FIG. 1. Each of electrodes 2 and 3 typically is of indium-doped tin oxide (ITO). The series duo of PIN layers is formed over electrode 2. It comprises an electrode 41, p-type layer 51, intrinsic or very lightly doped layer 52, and n-type layer 53. Each of layers 51, 52 and 53 is of amorphous silicon (a-silicon) formed in known fashion by a glow discharge decomposition process and typical thicknesses of layers 51, 52 and 53 are 500 Angstroms, 0.5 micron and 500 Angstroms, respectively. Over layer 53 is formed a second electrode 42 over which are deposited a second set of layers 51, 52, 53 as before and a third electrode 43 is deposited over layer 53. Each of electrode layers 41, 42 and 43 typically is of chromium deposited by electron beam vapor deposition, or sputtering, and has a thickness of about 1000 Angstroms. These layers typically are patterned to the desired form by photoetching techniques.

There results between electrodes 41 and 43 a pair of PIN laminates. The resulting structure has a threshold voltage betwen electrodes 41 and 43 twice that a single PIN laminate would have and such higher threshold is desirable for improved control of the liquid crystal element with which it is to be associated.

Next, there is formed an insulating film 6, for example of silicon nitride deposited by glow discharge decomposition of a silane and ammonia mixture in known fashion. The film is patterned as desired, typically by photoetching. The film is provided with an opening 7 where it overlies the central portion of electrode 43 and an aluminum layer 8 is deposited over the film 6, typically by vapor deposition or sputtering to contact electrode 43 by way of the opening 7 in the film 6. Layer 8 has an extension which makes electrical connection to electrode 3. The layer 8 is patterned, typically by photoetching, not to extend so far as to contact electrode 2. It also does not wrap completely around the edges of the laminate, since this was thought to be unnecessary.

Moreover, although not shown in FIG. 2, a similar structure would be formed over a portion of electrode 3, and the final aluminum layer 8 in this case would make electrical connection selectively only to electrode 2 whereby there would be formed between electrodes 2 and 3 a parallel pair of diodes oppositely poled, each of the diodes comprising a series of two PIN elements of the kind shown in FIG. 2.

FIG. 3 shows the typical current-voltage characteristics of the parallel pair of oppositely-poled diodes and the solid line shows the characteristics in the dark of a good pair. However, when the pair was illuminated with ambient light at low voltages the broken-line characteristic resulted. This showed high current even at low bias voltages. When this current is high, the ability of the diode pair to accumulate voltage is lowered and this impairs the quality of the display considerably. What was surprising was how sensitive the quality of the display was to ambient light incident on the diode.

The object of the invention is a diode pair of the general kind described for use in a liquid crystal display and which has a low current-low voltage characteristic both in the light and in the dark.

SUMMARY OF THE INVENTION

The solution to the problem posed by ambient light to the current-voltage characteristic of the prior art diode pair is a construction that shields the diode pair from ambient light.

In particular, the construction of the prior art device described is modified so that the electrodes included effectively shield the photosensitive semiconductor layer from ambient light. To this end in the preferred embodiment, the bottommost electrode, i.e. the one closest to the substrate, is made of larger area than the semiconductive layer that overlies it while the uppermost electrode is designed to wrap around completely the edges of the semiconductive material while insulated therefrom.

The invention will now be described in more detail with specific reference to the drawings.

DESCRIPTION OF THE INVENTION

Figure 1:
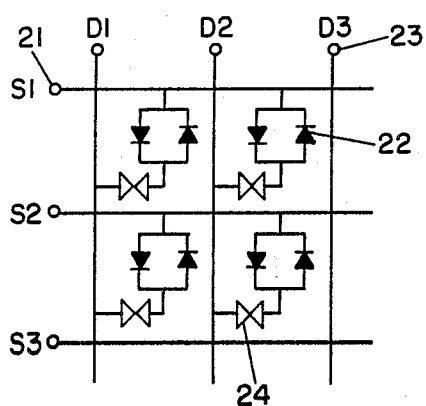
FIG. 1 is a schematic circuit representation of a portion of a liquid crystal display to which the invention is applicable.
Figure 2:
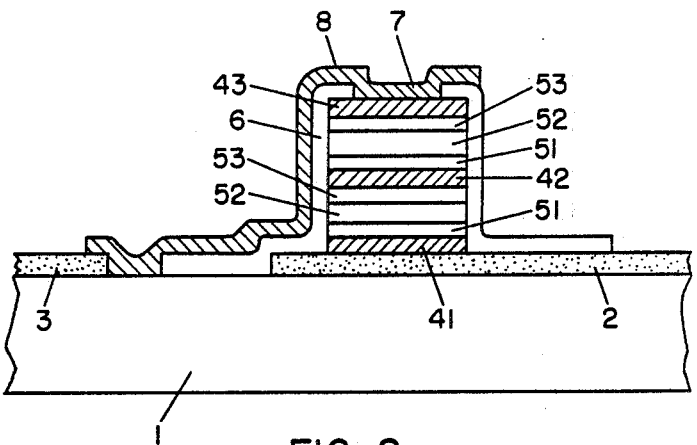
FIG. 2 shows in section the prior art structure of one of the pair of diodes shown in FIG. 1.
Figure 3:
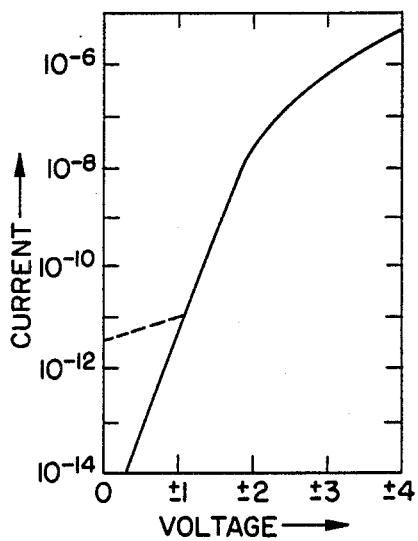
FIG. 3 shows the current-voltage characteristic of a diode pair formed by a pair of diodes of the kind shown in FIG. 2.
Figure 4:
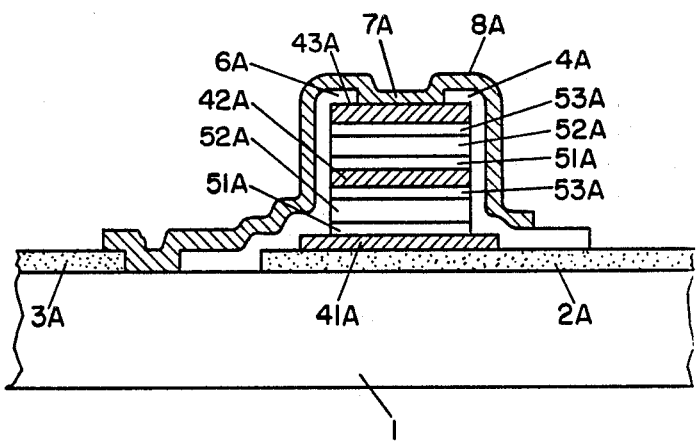
FIG. 4 shows in section one embodiment of the invention.

FIG. 4 shows one embodiment of the invention and uses the same reference numerals for parts common to those in FIG. 1 except that the letter suffix A is added to the parts shown in FIG. 4. FIG. 4 is different from FIG. 1 in that the electrode 41A formed on transparent conductive film 2A is larger in area than the electrode 41 in FIG. 1 so that electrode 41A has a larger surface area than each of a-Si layers 51A, 52A and 53A, the second electrode 42A, and the uppermost electrode 43A. Additionally, both the upper and side surfaces of the diode are completely covered, by way of the insulating film 6A, by the electrode 8A which is in contact with the electrode 43A by way of the contact opening 7A. Further the electrode 8A extends beyond a region overlying the upper surface area of the electrode 41A. As a result of this construction, light rays that might be incident upon a-Si layers 51, 52, and 53 are blocked by the electrode 41A and the electrode 8A, so that curent voltage characteristics of the non-linear resistance element under high illuminance are the same as those of it in the dark. Essentially, the constructioin is such that each diode of the diode pair is effectively shielded from ambient light.

Figure 5A:
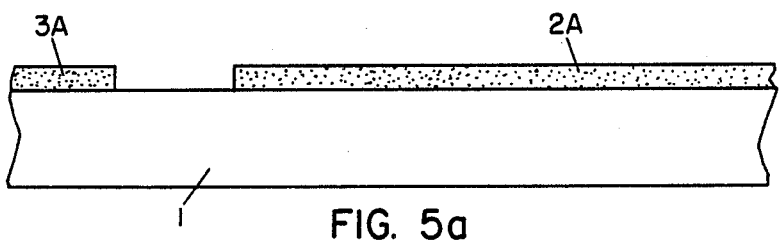
FIG. 5 illustrates an embodiment of the invention at different stages of a typical fabrication process.
Figure 5B:
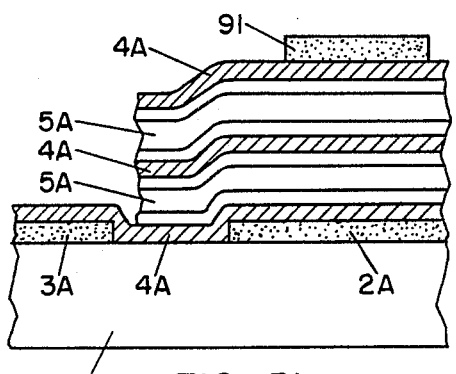
Figure 5C:
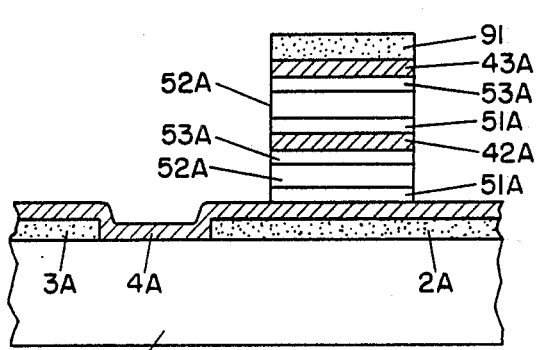
Figure 5D:
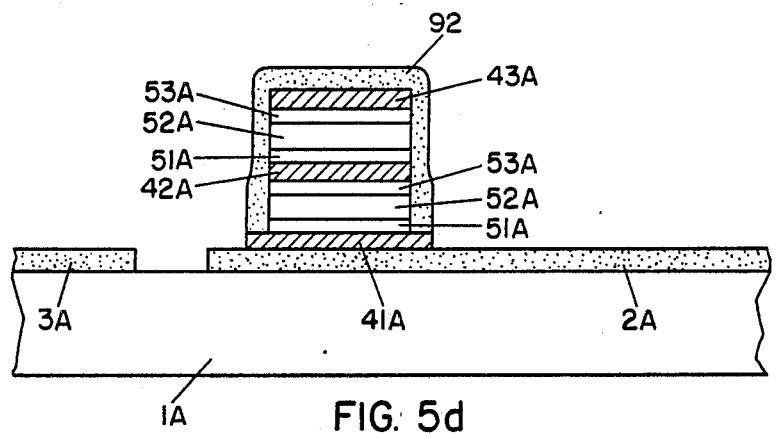
Figure 5E:
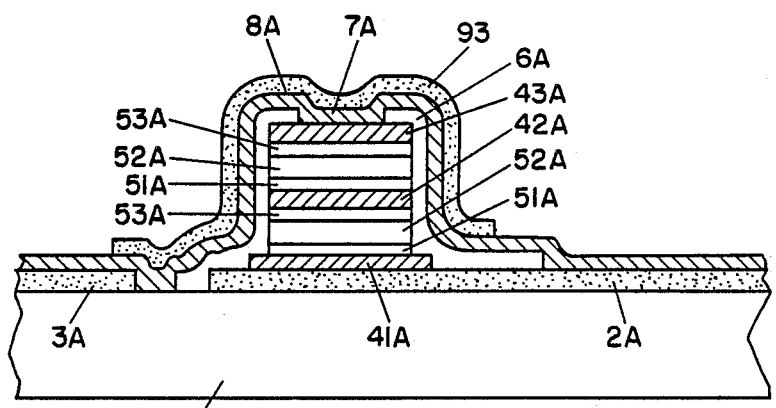

The basic steps of the process for manufacturing the element will be described with reference to FIG. 5. A pattern of the transparent electrodes 2A and 3A is formed on a glass substrate, as shown in FIG. 5(a). Then the Cr layer 4A and the triple a-Si laminate 5A are laminated alternately over the entire surface of glass substrate to reach the stage of FIG. 5(b). Each of the triple a-Si layers is appropriately doped during its deposition. A resist pattern 91 is formed on the top of the laminate, and then each of layers 5A and 4A except the lowest chromium layer is patterned by well-known plasma etching methods to form a-Si layers 51A, 52A, and 53A and Cr electrodes 42A and 43A, as shown in FIG. 5(c). Anisotropic vertical etching of Cr layer 4A can be carried out accurately by a plasma using a gaseous mixture of $BCl_3$ and $O_2$ and anisotropic vertical etching of a-Si layer 5A can be carried out similarly by a plasma using a gaseous mixture of $CF_4$ and $O_2$. Next, as shown in FIG. 5(d), a resist is deposited over the laminated structure and baked at 120° C. for b 30 hours to form a resist pattern 92 extending to the outside of the diode part, and, after that, the lowest chromium layer can be treated by a plasma etching method to form the lowest larges electrode 41A. As shown in FIG. 5(e), after the laminate is coated with an insulating film 6, such as of $Si_3N_4$, this film is patterned and, after that, a vapor-deposited Al layer 8A is formed on the surface of the insulating film and on the surface of glass substrate. After that, the Al layer is coated with a resist 93 in an area extending several microns beyond a region covering the upper surface area of the lower electrode 41A and then the Al layer is treated by plasma etching to complete the structure of FIG. 4.

Current-voltage characteristics of devices made with the described process were measured, and it was found that the current in the low bias region did not exceed $10^{-13}$ A, even under high illuminance of 10,000–50,000 lux. Thus a non-linear resistance element suitable for driving liquid crystal display element was obtained.

Figure 6:
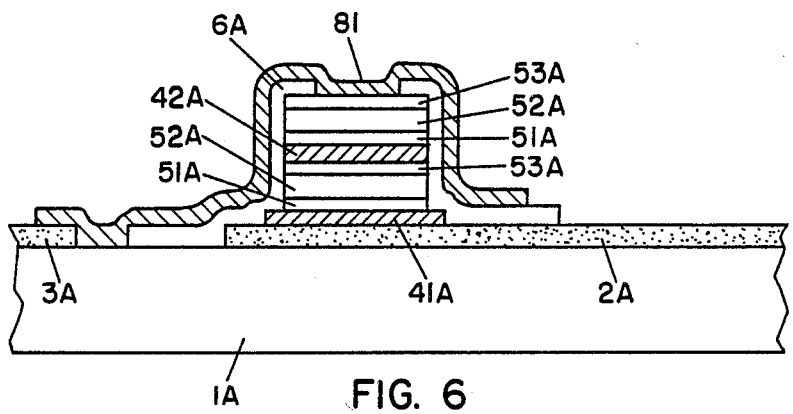
FIGS. 6 and 7 each show other embodiments of the invention.

FIG. 6 shows another embodiment of a non-resistance element. It differs from that of FIG. 4 in that there is omitted the chromium electrode 43A as the uppermost layer in FIG. 6. The omission of the Cr electrode 43A is made practicable by increased doping of the uppermost n-type a-Si layer 53A and by use of a chromium wrap-around electrode 81 in place of the aluminum electrode 7A.

Figure 7:
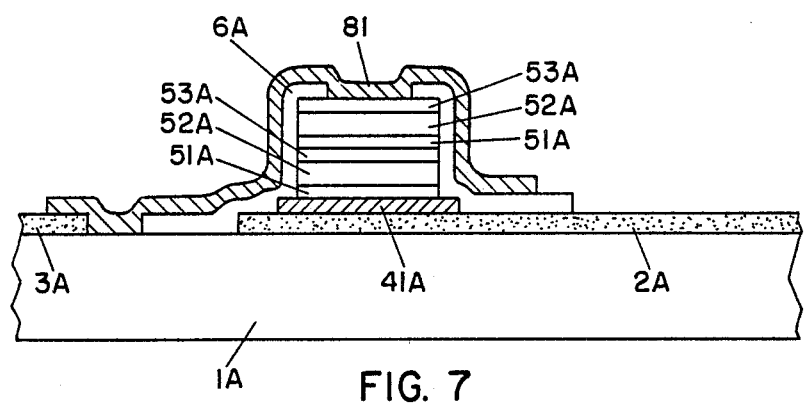

FIG. 7 shows another embodiment, in which, in addition, the intermediate chromium electrode 42A is also omitted as compared to the embodiment of FIG. 6. As a result, the leakage current of the diode is reduced and the yield of good devices is further improved. This appears to result because the edges of the a-Si layers are not exposed to a metallic atmosphere when being patterned in the step corresponding to FIG. 5(c), and the likelihood of short circuiting by metal deposits at the edges is reduced. As a result of adoption of the embodiment of FIG. 7, considerable improvements in yield have been obtained.

Additionally to make this embodiment, the gas need not be changed in the plasma-etching step of FIG. 5(c), which is effective to decrease cost.

It will be apparent that various modifications may be made in the specific embodiments described without departing from the spirit and scope of the invention. In particular a variety of materials other than those mentioned and alternative processes may be used to fabricate the device.

As previously indicated, the key feature is to employ an electrode arrangement for the device that effectively shields the light-active regions of the device from ambient light.

We claim:

1. A display panel which includes on opposite surfaces a plurality of row electrodes and a plurality of column electrodes orthogonally disposed to define a plurality of crosspoints, and a liquid crystal element in series with a parallel pair of oppositely poled diodes connected between each crosspoint characterized in that each diode includes a top electrode and a bottom electrode between which is a laminate of semiconductive material, and the bottom electrode has a surface supporting the laminate which is larger in area than the area of contact for shielding the bottom from ambient light, and the top electrode which contacts the top layer of the laminate wraps around the side edges of the laminate while insulated therefrom, whereby the edges of the laminate are shielded from ambient light.

2. The display panel of claim 1 in which the laminate has its side surfaces and top surface coated with an insulating film and the top electrode makes contact with the top surface of the laminate by way of an opening in the film and extends completely around the side surfaces of the laminate.

3. The display panel of claim 2 in which the diode is supported on a transparent insulating substrate on which are also included a pair of conductive layers, one of which is an extension of one of the orthogonally disposed electrodes and the other of which is an extension to a terminal of the liquid crystal element, and the bottom electrode and top electrode of the diodes are connected to different ones of the two conductive layers.

* * * * *